United States Patent [19]
Barlow et al.

[11] 3,930,007
[45] Dec. 30, 1975

[54] PESTICIDAL BIS-PYRIDYL AMINE DERIVATIVES

[75] Inventors: Charles Brian Barlow, Camberley; Clive Dudley Spencer Tomlin, Maidenhead, both of England

[73] Assignee: Imperial Chemical Industries Limited, London, England

[22] Filed: May 13, 1974

[21] Appl. No.: 469,599

Related U.S. Application Data

[62] Division of Ser. No. 164,082, July 19, 1971, Pat. No. 3,830,822.

[30] Foreign Application Priority Data

Aug. 4, 1970 United Kingdom............... 37585/70

[52] U.S. Cl.................. 424/263; 71/94; 260/296 R; 424/226

[51] Int. Cl.² ........................................... A01N 9/22
[58] Field of Search.................. 260/296 R; 424/263

[56] References Cited
UNITED STATES PATENTS

| | | | |
|---|---|---|---|
| 3,364,223 | 1/1968 | Johnston............................ | 424/263 |
| 3,375,257 | 3/1968 | Thiele et al........................ | 260/295 |
| 3,674,877 | 7/1972 | Freeman............................ | 424/263 |
| 3,819,558 | 6/1974 | Ruetman............................ | 424/263 |
| 3,830,822 | 8/1974 | Barlow et al...................... | 260/296 R |

*Primary Examiner*—V. D. Turner
*Attorney, Agent, or Firm*—Cushman, Darby & Cushman

[57] ABSTRACT

Pesticidal compositions containing bis-pyridyl amine derivatives and methods of using the same.

9 Claims, No Drawings

PESTICIDAL BIS-PYRIDYL AMINE DERIVATIVES

This is a division, of application Ser. No. 164,082 filed July 19, 1971 now U.S. Pat. No. 3,830,822.

This invention relates to new compounds, to processes for obtaining them, to compositions comprising them, and to methods of combating pests using them.

Accordingly this invention provides compounds having the general formula:

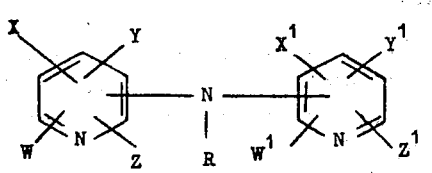

wherein R represents an atom of hydrogen, an unsubstituted or substituted hydrocarbon group or an acyl group; W, $W^1$, X, $X^1$, Y, $Y^1$, Z and $Z^1$ represent atoms of hydrogen or halogen, or cyano, azido, hydroxy, nitro, nitroso, thiocyano, or perhalocarbyl groups, or unsubstituted, or substituted, hydrocarbyl, hydrocarbyloxy, hydrocarbylthio, amino, acyloxy, hydrocarbylcarbonyl or hydrocarbylsuphonyl groups, or a carboxylic or sulphur-containing acid group or a salt, amide or ester derived therefrom; provided that not more than three of W, $W^1$, X, $X^1$, Y, $Y^1$, Z and $Z^1$ are atoms of hydrogen; and N-oxides of such compounds.

In a preferred aspect the invention provides compounds having the general formula:

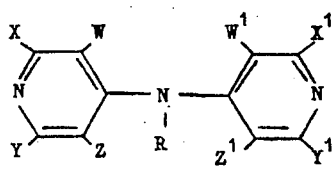

wherein R represents an atom of hydrogen, an unsubstituted or substituted hydrocarbon group or an acyl group; W, $W^1$, X, $X^1$, Y, $Y^1$, Z and $Z^1$ represent atoms of hydrogen or halogen, or cyano, azido, hydroxy, nitro, nitroso, thiocyano, or perhalocarbyl groups, or unsubstituted, or substituted, hydrocarbyl, hydrocarbyloxy, hydrocarbylthio, amino, acyloxy, hydrocarbylcarbonyl or hydrocarbylsulphonyl groups, or a carboxylic or sulphur-containing acid group or a salt, amide or ester derived therefrom; provided that not more than three of W, $W^1$, X, $X^1$, Y, $Y^1$, Z and $Z^1$ are atoms of hydrogen.

In a more preferred aspect the invention provides compounds having the formula:

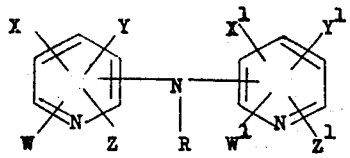

wherein R represents a hydrogen atom or an alkyl group; W, $W^1$, X, $X^1$, Y, $Y^1$, Z and $Z^1$ represent atoms of hydrogen or halogen, or cyano, azido, nitro, perhaloalkyl, alkoxy, aralkoxy, aryloxy, alkoxyalkoxy, alkylthio, arylthio, alkylamino, alkanesulphonyl, carboxylic acid, carboxylic ester, or carboxamide groups; provided that not more than three of W, $W^1$, X, $X^1$, Y, $Y^1$, Z and $Z^1$ are atoms of hydrogen; and N-oxides of such compounds.

In a yet more preferred aspect the invention provides compounds having the formula:

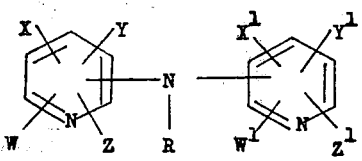

wherein R represents a hydrogen atom or a methyl group; W, $W^1$, X, $X^1$, Y, $Y^1$, Z and $Z^1$ represent atoms of hydrogen, fluorine, chlorine or bromine, or cyano, nitro, azido, trifluoromethyl, alkoxy containing up to 8 carbon atoms, benzyloxy, phenoxy, ethoxyethoxy, methylthio, phenylthio, methylamino, ethylamino, dimethylamino, methanesulphonyl, carboxylic acid, carboxylic acid methyl ester or carboxamide groups; provided that not more than three of W, $W^1$, X, $X^1$, Y, $Y^1$, Z and $Z^1$ are atoms of hydrogen; and N-oxides of such compounds.

In an even yet more preferred aspect the invention provides compounds having the formula:

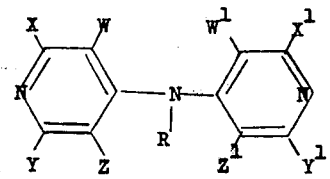

wherein R represents an atom of hydrogen, an alkyl group or an acyl group; and W, $W^1$, X, $X^1$, Y, $Y^1$, Z and $Z^1$ represent alkoxy, cyano, nitro, or haloalkyl groups, or atoms of hydrogen, chlorine or fluorine, provided that at least one of W, $W^1$, X, $X^1$, Y, $Y^1$, Z and $Z^1$ represents an alkoxy, cyano, nitro, or haloalkyl group, and that at least four of the remaining substituents are atoms of chlorine or fluorine.

Particularly useful compounds are those comprising halogen atoms and electron donating groups as substituents. In a further aspect therefore the invention provides compounds having the general formula:

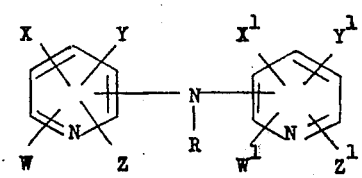

wherein R represents an atom of hydrogen, an unsubstituted or substituted hydrocarbon group or an acyl group; W, $W^1$, X, $X^1$, Y, $Y^1$, Z and $Z^1$ represent atoms of hydrogen or halogen, or electron donating groups provided that at least one of W, $W^1$, X, $X^1$, Y, $Y^1$, Z and $Z^1$ is an electron donating group and at least four of the remaining substituents are atoms of halogen.

The term "electron donating group" as used in this specification includes, for example, hydrocarbyl groups, hydrocarbyloxy groups, hydrocarbylthio groups, and unsubstituted and substituted amino groups.

In an especially preferred aspect the invention provides compounds having the formula:

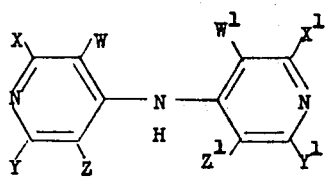

wherein one of $W$, $W^1$, $X$, $X^1$, $Y$, $Y^1$, $Z$ and $Z^1$ represents a methoxy group and the remainder represent atoms of fluorine or chlorine.

Compounds according to the invention are those whose structural formulae are believed to be those given in Table I below, together with a physical characteristic for each compound.

TABLE I

| Compound No. | Structural Formula | Physical Characteristic |
|---|---|---|
| 1 | (structure with OCH$_3$) | m.p. 125–127°C |
| 2 | (structure with OC$_2$H$_5$) | m.p. 124.5–126.1°C |
| 3 | (structure with OC$_3$H$_7$(n)) | m.p. 103.5–105.6°C |
| 4 | (structure with OCH(CH$_3$)$_2$) | m.p. 70.0–73.5°C |
| 5 | (structure with OC$_4$H$_9$(n)) | m.p. 66.2–68.2°C |
| 6 | (structure with OCH$_3$) | m.p. 75.9–77.1°C |
| 7 | (structure with OC$_2$H$_5$) | m.p. 77.7–78.8°C |

TABLE 1 cont'd

| Compound No. | Structural Formula | Physical Characteristic |
|---|---|---|
| 8 | [3,5-dichloro-2,6-dichloropyridin-4-yl]-NH-[3,5-dichloro-2-chloro-6-methoxypyridin-4-yl] | m.p. 209.7–210.9°C |
| 9 | [3,5-dichloro-2,6-dichloropyridin-4-yl]-NH-[3,5-dichloro-2-chloro-6-ethoxypyridin-4-yl] | m.p. 165.4–167.0°C |
| 10 | [3-Cl,5-Cl,2-F,6-F pyridin-4-yl]-NH-[3-Cl,5-F,2-F pyridin-4-yl-6-OCH(CH$_3$)C$_6$H$_{13}$(n)] | b.p. 170°C/0.35 mm.Hg. |
| 11 | [3-Cl,5-Cl,2-F,6-F pyridin-4-yl]-NH-[3-Cl,5-Cl,2-OCH$_3$,6-OCH$_3$ pyridin-4-yl] | m.p. 153.2–155.1°C |
| 12 | [3-Cl,5-Cl,2-F,6-F pyridin-4-yl]-NH-[3-Cl,5-Cl,2-F pyridin-4-yl-6-OCH$_2$CH$_2$OC$_2$H$_5$] | m.p. 88.9–90.4°C |
| 13 | [3-Cl,5-Cl,2-F,6-F pyridin-4-yl]-N(CH$_3$)-[3-Cl,5-Cl,2-F,6-OCH$_3$ pyridin-4-yl] | m.p. 197°C |
| 14 | [3-F,5-F,2-F,6-F pyridin-4-yl]-NH-[3-Cl,5-Cl,2-F,6-OCH$_3$ pyridin-4-yl] | m.p. 95.5–97.2°C |
| 15 | [3-Cl,5-Cl,2-F,6-F pyridin-4-yl]-NH-[3-Cl,5-Cl,2-F,6-OCH$_2$C$_6$H$_5$ pyridin-4-yl] | m.p. 95.1–96.2°C |

TABLE 1 cont'd
| Compound No. | Structural Formula | Physical Characteristic |
|---|---|---|
| 16 | 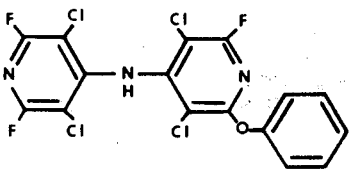 | m.p. 114.2–116.5°C |
| 17 | 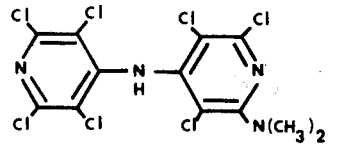 | m.p. 175°C |
| 18 | 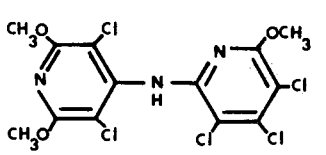 | m.p. 210–211°C |
| 19 | 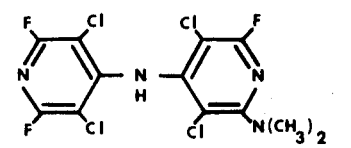 | m.p. 165°C |
| 20 | 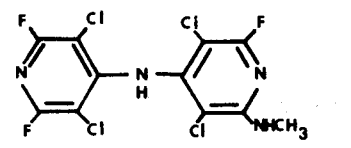 | m.p. 155°C |
| 21 | 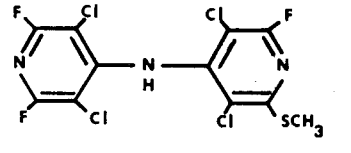 | m.p. 146°C |
| 22 | 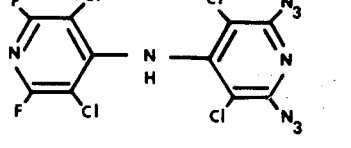 | m.p. 157–159°C |
| 23 | 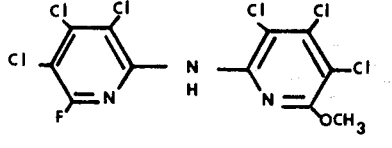 | m.p. 195–196°C |

TABLE 1 cont'd

| Compound No. | Structural Formula | Physical Characteristic |
|---|---|---|
| 24 | 2,5-dichloro-6-fluoro-3-chloro-4-[(3,5-dichloro-2-fluoropyridin-4-yl)amino]-2-methoxypyridine | m.p. 151–152°C |
| 25 | 3,5-dichloro-4-[(3,5-dichloro-2,6-difluoropyridin-4-yl)amino]-6-chloro-2-methoxypyridine | m.p. 152–153°C |
| 26 | 3,5-dichloro-4-[(3,5-dichloro-2,6-difluoropyridin-4-yl)amino]-6-fluoro-2-(phenylthio)pyridine | m.p. 136–137°C |
| 27 | 3,5-dichloro-4-[(2,3,5,6-tetrachloropyridin-4-yl)amino]-6-fluoro-2-methoxypyridine | m.p. 191–192°C |
| 28 | 3,5-dichloro-4-[(3,5-dichloro-2-fluoro-6-chloropyridin-4-yl)amino]-6-chloro-2-methoxypyridine | m.p. 162–163°C |
| 29 | 3,5-dichloro-4-[(3,5-dichloro-2,6-difluoropyridin-4-yl)amino]-6-fluoro-2-(ethylamino)pyridine | m.p. 138–139°C |
| 31 | N-(3,4,6-trichloro-5-fluoropyridin-2-yl)-3,4,6-trichloro-5-fluoropyridin-2-amine | m.p. 164.7–165.6°C |

TABLE 1 cont'd

| Compound No. | Structural Formula | Physical Characteristic |
|---|---|---|
| 32 | (3,4,5-trichloro-6-fluoropyridin-2-yl)-NH-(3,5-dichloro-2-fluoro-6-methoxypyridin-4-yl) | m.p 199.6–200.9°C |
| 33 | (2,6-difluoro-3,5-dichloropyridin-4-yl)-NH-(3,4,6-trichloropyridin-2-yl N-oxide) | m.p. 130–131°C |
| 34 | (2,6-difluoro-3,5-dichloropyridin-4-yl)-NH-(2,6-difluoro-3,5-dichloropyridin-4-yl) | m.p. 123–124.3°C |
| 35 | (2,3,5,6-tetrafluoropyridin-4-yl)-NH-(2,3,5,6-tetrafluoropyridin-4-yl) | m.p. 151°C |
| 36 | (2,3,5,6-tetrachloropyridin-4-yl)-NH-(2,3,5,6-tetrachloropyridin-4-yl) | m.p. 260°C |
| 37 | (2,6-difluoro-3,5-dichloropyridin-4-yl)-NH-(2,6-difluoro-3,5-dichloropyridin-4-yl) | m.p. 75.2°C |
| 38 | (2,3,5,6-tetrachloropyridin-4-yl)-NH-(3,5-dichloro-2,6-difluoropyridin-4-yl) | m.p. 183°C |
| 39 | (2,3,5,6-tetrachloropyridin-4-yl)-NH-(2,3,5,6-tetrafluoropyridin-4-yl) | m.p. 111.3–111.7°C |

TABLE 1 cont'd

TABLE 1 cont'd

| Compound No. | Structural Formula | Physical Characteristic |
|---|---|---|
| 40 | 2,3,5,6-tetrachloropyridin-4-yl-NH-3,5-dichloro-2,6-difluoropyridin-4-yl | m.p. 105.6–106.2°C |
| 41 | 3,5-dichloro-2,6-difluoropyridin-4-yl-NH-3,4-dichloro-5-cyano-6-fluoropyridin-2-yl | m.p. 178.2–180.2°C |
| 42 | 3-chloro-2,6-difluoro-5-Cl-pyridin-4-yl-NH-3-cyano-4,5-difluoro-6-pyridinyl | m.p. 123°C |
| 43 | 3,5-dichloro-2,6-difluoropyridin-4-yl-NH-5-nitropyridin-2-yl | m.p. 153°C |
| 44 | 3,5-dichloro-2,6-difluoropyridin-4-yl-NH-3,4-dichloro-6-fluoropyridin-2-yl | m.p. 106°C |
| 45 | 2,3,5,6-tetrafluoropyridin-4-yl-NH-3,5,6-tribromopyridin-4-yl | m.p. 152°C |
| 46 | 3,5-dichloro-2,6-difluoropyridin-4-yl-NH-2,3,5,6-tetrafluoropyridin-4-yl | m.p. 110.0–110.9°C |
| 47 | 3,5-dichloro-2,6-difluoropyridin-4-yl-NH-2,6-difluoropyridin-4-yl | m.p. 203°C |

TABLE 1 cont'd

| Compound No. | Structural Formula | Physical Characteristic |
|---|---|---|
| 48 | 3-F,5-F,4-Cl,6-Cl-pyridin-4-yl-NH-3-Cl,5-Cl,6-Cl-2-CO₂CH₃-pyridin-4-yl | m.p. 164–166 °C |
| 49 | 3-F,5-F,4-Cl,6-Cl-pyridin-4-yl-NH-3-Cl,5-Cl,2-CF₃,6-Cl-pyridin-4-yl | m.p. 77.5–79.5 °C |
| 50 | 3-F,5-F,4-Cl,6-Cl-pyridin-4-yl-NH-3-Cl,5-Cl,2-CO₂H-pyridin-4-yl | m.p. 210–211 °C (decomposition) |
| 51 | 3-F,5-F,4-Cl,6-Cl-pyridin-4-yl-NH-3-Cl,5-Cl,6-F,2-SO₂CH₃-pyridin-4-yl | m.p. 180–183 °C |
| 52 | 3-F,5-F,4-Cl-pyridin-4-yl-NH-3-CN,5-NO₂-pyridin-2-yl | m.p. 166–167 °C |
| 53 | 3-F,5-F,4-Cl,6-Cl-pyridin-4-yl-NH-3-Cl,5-Cl,6-Cl,2-CONH₂-pyridin-4-yl | m.p. 204–205 °C |
| 54 | 3-F,5-F,4-Cl-pyridin-4-yl-NH-3-CN,5-F-pyridin-2-yl | m.p. 204–205 °C |

TABLE 1 cont'd

| Compound No. | Structural Formula | Physical Characteristic |
|---|---|---|
| 55 | [pyridine-N(⁻)-pyridine structure with F, Cl substituents] K+ | m.p. >330° |
| 56 | [pyridine-N(⁻)-pyridine structure with F, Cl, OCH₃ substituents] (C₂H₅)₃NH(+) | m.p. 123–127°C |
| 57 | [pyridine-NH-pyridine structure with F, Cl, CN substituents] | m.p. 147.9–149.0°C |
| 58 | [pyridine-NH-pyridine structure with F, Cl substituents] | m.p. 151.4–152.6°C |
| 59 | [pyridine-NH-pyridine structure with F, Cl, CN substituents] | m.p. 111.1–112.3°C |
| 60 | [pyridine-NH-pyridine structure with F, Cl substituents] | m.p. 144.8–145.7°C |

Table I cont'd

| Compound No. | Structural Formula | Physical Characteristic |
|---|---|---|
| 61 | 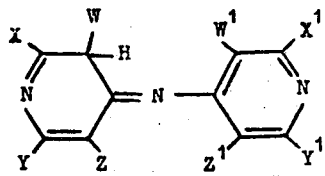 | m.p. 130.1–130.5°C |
| 62 | 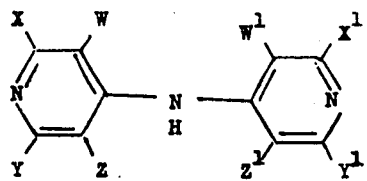 K⁺ | m.p. 296–299°C |
| 63 | 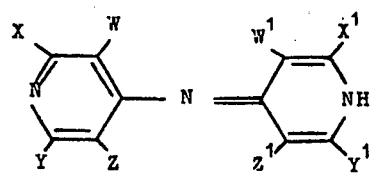 (C₂H₅)₃NH⁺ | m.p. 111–116° |

It should be noted that for each of the compounds of Table 1, except compound 13, the formula given is one of a number of tautomeric possibilities. Thus compounds of the general formula:

[structure]

may also be represented by other tautomerically related formulae, including, for example, the following:

[structures]

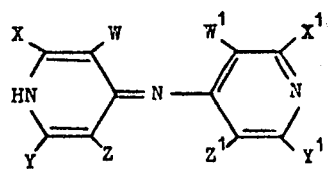

etc.

Where the nature of a substituent allows it the tautomeric possibilities are even further increased. The present invention is to be considered as including within its scope all tautomeric forms of the invention compounds.

Another possibility with some of the azido substituted compounds of the present invention is that the structures of the compounds may be represented as tetrazolepyridines. Thus, for example, compound no. 22 of Table I, may be represented as having the isomeric structural formula:

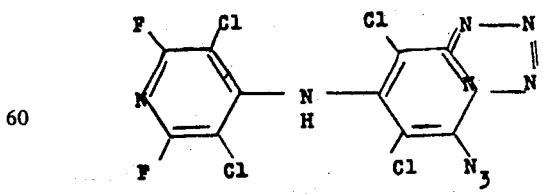

or a tautomeric form thereof, and the present invention includes within its scope all such isomeric and tautomeric forms.

A particularly useful compound pesticidally is 3,3',5,5'-tetrachloro-2,2',6-trifluoro-6'-methoxy-4,4'-bispyridylamine, which is compound No. 1 of Table I hereinabove.

An interesting and unexpected feature of the salts of the invention compounds, as exemplified by compounds 55,56, 62 and 63 of Table I, is their solubility characteristics. Thus they appear to be more soluble in solvents of lower polarity. Compounds 55 and 62 were insoluble in water, but soluble in ethanol or acetone, and compounds 56 and 61 were insoluble in water or ethanol and soluble only in acetone.

The compounds of the present invention are conveniently prepared by the treatment of a compound having the formula:

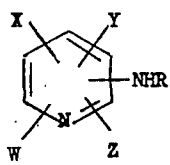

with a base, and then reacting the treated compound thus produced with a compound of the formula:

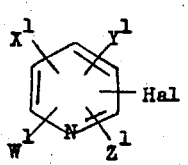

wherein $W$, $W^1$, $X$, $X^1$, $Y$, $Y^1$, $Z$, and $Z^1$ have any of the meanings hereinbefore defined and Hal represents an atom of halogen. A suitable base for use in the above reaction is sodium hydride, and the process may be carried out in a diluent or solvent, for example dimethylformamide. Many of the reactants used in the above process are themselves novel compounds, and have not been previously described in the literature.

In a further aspect therefore the invention provides compounds having the formula:

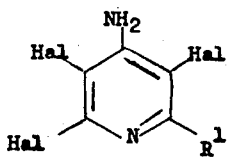

where each Hal separately represents fluorine or chlorine and $R^1$ is an unsubstituted, or substituted, hydrocarbyloxy, hydrocarbylthio or amino group. These compounds may be obtained by treating the corresponding tetrahalopyridylamine with a compound $R^1H$, optionally in the presence of a base.

In particular, the invention provides the compound having the formula:

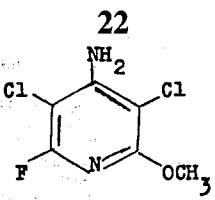

which has utility as a reactant in the preparation of certain of the invention compounds as hereinbefore defined.

This reactant may be prepared by treating the compound having the formula:

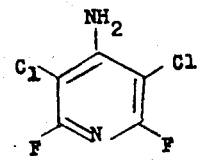

with a methanolic solution of sodium methoxide.

The compounds of the invention may be used as pesticides either on their own or, preferably, incorporated in a composition comprising a diluent in addition to the invention compound.

The invention, therefore, further provides pesticidal compositions, comprising as an active ingredient a compound having the formula:

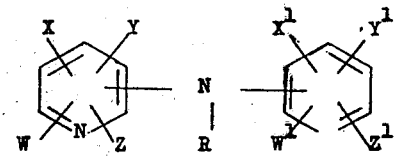

wherein $R$, $W$, $W^1$, $X$, $X^1$, $Y$, $Y^1$, $Z$ and $Z^1$ have any of the meanings as hereinbefore defined.

In a preferred aspect the invention provides pesticidal compositions comprising as an active ingredient any of the compounds given in Table I.

Compounds of the invention and compositions comprising them are very toxic towards insect and other invertibrate pests, including for example the following:

| | |
|---|---|
| Tetranychus telarius | (red spider mites) |
| Plutella maculipennis | (diamond back moth) |
| Aphis fabae | (black aphids) |
| Pieris brassicae | (cabbage white caterpiller) |
| Blattella germanica | (cockroaches) |
| Megoura viciae | (green aphids) |
| Phaedon cochleariae | (mustard beetle) |
| Musca domestica | (houseflies) |
| Aedes aegypti | (mosquitos) |
| Agriolimax reticulatus | (greyfield slug) |
| Meloidogyne incognita | (nematodes) |
| Calandra granaria | (grain weevils) |
| Boophilus spp. | (cattle ticks) |

The compounds of the invention, and compositions comprising them, possess activity against a wide variety of plant foliar and post-harvest fungal and bacterial diseases including, for example, the following specific diseases:

| | | |
|---|---|---|
| Sphaerotheca fuliginea | (powdery mildew) | on cucumber |
| Puccinia recondita | (rust) | on tomatoes |
| Botrytis cinerea | (chocolate spot) | on broad beans |
| Phytophthora infestans | (late blight) | on broad beans |
| Podosphaera leucotricha | (powdery mildew) | on apple |
| Uncinula necator | (powdery mildew) | on vine |
| Piricularia oryzae | (blast) | on rice |
| Plasmopara viticola | (downy mildew) | on vine |
| Venturia inaequalis | (scab) | on apple |
| Botrytis tulipae | (fire) | on bulbs |
| Nigrospora sphaerica | (squirter) | on bananas |
| Phomopsis citri | (scab) | on citrus |
| Alternaria citri | (end rot) | on citrus |
| Phytophthora citrophthora | (brown rot) | on citrus |
| Penicillium digitatum | (green mould) | on citrus |
| Gloeosporium musarum | (black end) | on bananas |
| Fusarium caeruleum | (dry rot) | on potatoes |
| Botrodipeodia theobromae | (stalk rot) | on bananas |
| Ceratocystis paradoxa | (gangrene) | on potatoes |
| Phoma exigus | (rot) | on pineapple |
| Phtophthora parasitica | (grey mould) | on citrus |
| Xanthomonas oryzae | (bacterial leaf blight) | on rice |
| Xanthomonas malvacearum | (blackarm) | on cotton |
| Erwinia amylovora | (fire blight) | on pears and apples |
| Erwinia carotovora | (bacterial soft rot) | of vegetables |
| Pseudomonas phaseolicola | (halo blight) | on beans |
| Pseudomonas syringae | (dieback) | of stone fruit |
| Pseudomonas mora-prunocrum | (bacterial canker) | of stone fruit |
| Corynebacterium michinganense | (bacterial canker) | |
| Streptomyces scabies | (scab) | on potatoes |
| Agrobacterium tumefaciens | (crown gall) | |

The invention compounds also display herbicidal activity and are preferably used at higher rates of application for this purpose. The compounds are also algicidal.

In use, the invention compounds, or compositions containing them, may be used to combat pests in a variety of ways. Thus the pests themselves, or the locus of the pests, or the pest habitat may be treated to control the pests.

In a further feature therefore the invention provides a method of combating pests wherein the pests, the locus of the pests, or the habitat of the pests is treated with a compound or a composition according to the invention.

The invention also provides a method of treating plants with a compound or composition according to the invention to render them less susceptible to damage by pests, which may already be occurring (i.e. treatment to eradicate an infestation or infection) or which are expected to occur (i.e. treatment to protect the plant from an infestation or infection).

In a yet further feature, therefore, the invention provides a method of treating plants to render them less susceptible to damage by pests, which comprises treating the plants, or the seeds, corms, bulbs, tubers, rhizomes or other propagative parts of the plants, with a compound or composition according to the invention.

If desired the medium in which the plants are growing may be similarly treated with a compound or composition according to the invention.

In another feature, therefore the invention provides a method of treating a medium in which plants are growing or to be grown which comprises applying to the medium a compound or composition according to the invention.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example kaolinite (china clay), montmorillonite, attapulgite, talc, pumic, silica, calcium carbonate, gypsum, powdered magnesia, Fuller's earth, Hewitt's earth and diatomaceous earth. Compositions for dressing seed, for example, may comprise an agent assisting the adhesion of the composition to the seed, for example, a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium calcium, or ammonium lignosulphonate, butylnaphthalene sulphonate, and a mixture of the sodium salts of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydrophilic colloids, for example polyvinylpyrrolidone and sodium carboxymethylcellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compounds of the invention may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive power and resistance to rain on treated surfaces, the different compositions can be better adapted for the various uses for which they are intended.

The compounds of this invention may also be conveniently formulated by admixing them with fertilizers. A preferred composition of this type comprises granules of fertilizer material incorporating, for example coated with, a compound of the invention. The fertilizer material may, for example, comprise nitrogen or phosphate-containing substances.

In yet a further aspect of the invention, therefore, we provide a pesticidal composition comprising as an active ingredient a compound of the invention in admixture with a fertilizer material.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredients or ingredients depending upon the purpose for which they are to be used, but an aqueous preparation containing between 0.0001 and 1.0% by weight of the active ingredient or ingredients may be used.

It is to be understood that the pesticidal compositions of this invention may comprise, in addition to a compound of the invention, one or more other compounds having biological activity.

The invention is illustrated, but not limited, by the following examples.

EXAMPLE 1

This example illustrates the preparation of 4-amino-3,5-dichloro-2-fluoro-6-methoxypyridine, having the formula:-

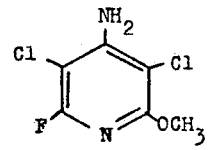

4-amino-3,5-dichloro-2,6-difluoropyridine (4.98 g.) was dissolved in methanol at 18°C., and a solution of sodium methoxide (prepared by dissolving sodium (0.576 g.) in methanol (25 cc.) ) added dropwise with stirring. The reaction mixture was then heated to reflux for two hours, after which time it was cooled and poured into excess distilled water. The precipitated product was collected by filtration and recrystallised from petroleum ether (boiling range 60° to 80°C.) to yield 4-amino-3,5-dichloro-2-fluoro-6-methoxypyridine, having a melting point of 107.9° to 108.3°C.

EXAMPLE 2

By a procedure similar to that illustrated in Example 1, but using the appropriate reactants the following compounds were prepared:-

4-amino-3,5-dichloro-2-fluoro-6-ethoxypyridine (m.p. 80°–82°C)

4-amino-3,5-dichloro-2-fluoro-6-n-propoxypyridine (m.p. 54°–55.5°C)

4-amino-3,5-dichloro-2-fluoro-6-isopropoxypyridine (m.p. 74°C)

4-amino-3,5-dichloro-2-fluoro-6-n-butoxypyridine (m.p. 47.3°–49.4°C)

4-amino-2,3,5-trifluoro-6-methoxypyridine (m.p. 92°–3°C)

4-amino-2,3,5-trifluoro-6-ethoxypyridine (m.p. 83°–86.9°C)

4-amino-2,3,5-trichloro-6-methoxypyridine (m.p. 98°–98.5°C)

4-amino-2,3,5-trichloro-6-ethoxypyridine (m.p. 83°–84°C)

4-amino-2,3,5-trifluoro-6(2-octyloxy) pyridine (b.p. 95°C/0.04 mm.)

4-amino-2,5-dichloro-2,6-dimethoxypyridine (m.p. 145°–146°C)

4-amino-2,5-dichloro-2-fluoro-6-ethoxyethoxypyridine (m.p 77.5°–79°C)

4-amino-3,5-dichloro-2-fluoro-6-benzyloxypyridine (m.p. 113°–114°C)

4-amino-3,5-dichloro-2-fluoro-6-phenoxypyridine (m.p. 127–128°C)

4-methylamino-3,5-dichloro-2-fluoro-6-methoxypyridine (m.p. 72.5°–73°)

EXAMPLE 3

This example illustrates the preparation of 4-amino-3,5-dichloro-6-fluoro-2-methylthiopyridine, having the formula:-

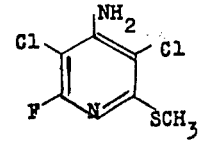

4-Amino-3,5-dichloro-2,6-difluoropyridine (19.9 g) was dissolved in 1,4-dioxane (300 cc) and sodium hydroxide (2N, 50 cc) was added to the solution. Gaseous methyl mercaptan was gently bubbled through the mixture and during the addition the temperature was slowly increased until refluxing occurred. The gas flow was continued until no starting material could be detected by thin layer chromatography on alumina using chloroform eluent. The mixture was evaporated under reduced pressure and the residue treated with water (100 cc.) to yield a white precipitate which was collected by filtration and recrystallised from petroleum ether (boiling range 60°–80°C). The 4-amino-3,5-dichloro-6-fluoro-2-methylthiopyridine thus obtained has a melting point of 99° to 100°C.

EXAMPLE 4

By an analogous procedure to that illustrated in Example 3, but using the appropriate amines or thiols in place of methyl mercaptan the following compounds were prepared:-

4-amino-2,3,5-trichloro-6-dimethylaminopyridine (m.p. 69°C)

4-amino-3,5-dichloro-2-fluoro-6-dimethylaminopyridine (m.p. 85°–86.6°C)

4-amino-3,5-dichloro-2-fluoro-6-methylaminopyridine (m.p. 144°–145°C)

4-amino-3,5-dichloro-2-fluoro-6-phenylthiopyridine (m.p. 107°–108°C)

4-amino-3,5-dichloro-2-fluoro-6-ethylaminopyridine (m.p. 108°–109°C)

EXAMPLE 5

This Example illustrates the preparation of 4-amino-3,5-dichloro-2,6-diazidopyridine having the formula:-

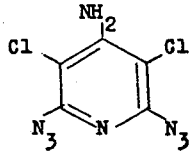

A mixture of 4-amino-3,5-dichloro-2,6-difluoropyridine (4.98 g) sodium azide (3.3 g) and dry dimethylformamide (100 cc.) was heated on a steam bath for 4 hours, after which the solution was poured into water. The precipitate which formed was collected by filtration and recrystallised from carbon tetrachloride to yield 4-amino-3,5-dichloro-2,6-diazidopyridine which was identified by elemental analysis and by its infra-red spectrum which showed a large absorption at 2190 cm$^{-1}$ characteristic of the azide radical.

EXAMPLE 6

This example illustrates the preparation of 4-amino-2,3,5-trichloropyridine having the formula:-

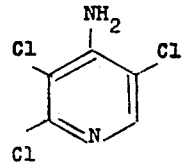

2,3,4,5-tetrachloropyridine (15 g) concentrated ammonium hydroxide (S.G. = 0.880; 5.16 cc.) and ethanol (30 cc) was heated for 4.5 hours at 135°C in a sealed tantalum tube. The pale yellow liquid obtained was evaporated under reduced pressure at room temperature, and the residue extracted with ether. The extracts were washed with water, and then dried over anhydrous magnesium sulphate. Evaporation under reduced pressure yielded a white crystalline solid which was washed with cold petroleum ether (boiling range 30° to 40°C) and recrystallised from petroleum ether (boiling range 60°–80°C) to yield 4-amino-2,3,5-trichloropyridine, having a melting point of 148.7°–149.3°C.

The halopyridines and other halogenated aminopyridines and cyanopyridines used as intermediates in the preparation of the invention compounds were prepared by the methods described in the literature, e.g. West German Offenlegungsschrift 1,816,685, Banks et al, J. Chem. Soc. (C), 1967, 2089-91, or British Patent Specification, Serial No. 1,161,492. 3-Cyano-2,4,5,6-tetrafluoropyridine (b.p. 164°–165°) is a new compound, prepared by refluxing 3-cyanotetrachloropyridine with anhydrous potassium fluoride in sulpholane.

EXAMPLE 7

This example illustrates the preparation of 4-amino-3,5-dichloro-6-fluoro-2-methanesulphonylpyridine having the formula:-

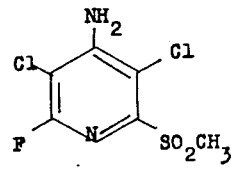

4-Amino-3,5-dichloro-6-fluoro-2-methylthiopyridine (5.0 g) was dissolved in acetone (60 cc) and 2N sulphuric acid (33 cc) was added to the solution. To this mixture was added over 30 minutes a solution of potassium permanganate (4.25 g) in water (250 cc.) The manganese dioxide produced was destroyed by bubbling in sulphur dioxide gas, the residual white suspension was collected by filtration and recrystallised from water to yield 4-amino-3,5-dichloro-6-fluoro-2-methanesulphonylpyridine, having a melting point of 140°–141°C.

EXAMPLE 8

This example illustrates the preparation of 4-amino-3,5 6-trichloro-2-trifluoromethylpyridine having the formula:-

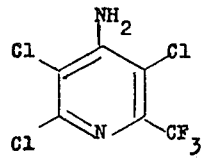

4-Amino-2-carboxy-3,5,6-trichloropyridine (7.3 g) was heated in an autoclave at 120°C with hydrogen fluoride (4.0 g) and sulphur tetrafluoride (8.0 g) for 8 hours. The resulting dark green liquid was evaporated to dryness and the residue treated with 10% w/v aqueous sodium hydroxide solution. The mixture was extracted with chloroform and the extracts dried over anhydrous sodium sulphate and evaporated under reduced pressure. The residual solid was purified by recrystallization from aqueous ethanol to yield 4-amino-3,5,6-trichloro-6-trifluoromethylpyridine, melting point at 107°–109°C.

EXAMPLE 9

This example illustrates the preparation of 3,3',5,5'-tetrachloro2',2',6'-trifluoro-6'-methoxy-4,4'-bis-pyridylamine, (Compound no. 1, Table I) having the structure:-

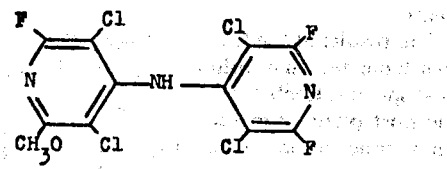

4-amino-3,5-dichloro-2-fluoro-6-methoxypyridine (3.17g.) was dissolved in dry dimethylformamide (20 cc.) and the solution added to a stirred suspension of sodium hydride (0.72 g.) in dry dimethylformamide (15 cc.), under a nitrogen atmosphere at a temperature of 10°C. When the addition was complete and evolution of hydrogen had ceased, a solution of 3,5-dichloro-2,4,6-trifluoropyridine (3.03 g.) in dry dimethylformamide (15 cc.) was added dropwise to the mixture. Some effervescence was observed during the addition, and when addition was complete the mixture was stirred for a further 2 hours, the temperature of the mixture being allowed to rise during this period to 18°C. The mixture was then poured onto ice, the resultant mixture acidified with dilute hydrochloric acid, and extracted with ether. The ether extracts were then washed with water, dried over sodium sulphate and evaporated. The residual solid obtained was recrystallised from petroleum ether (boiling range 60° to 80°C.) to yield 3,3'-5,5'-tetrachloro-2,2',6-trifluoro-6'-methoxy-4,4'-bispyridylamine, having a melting point of 125°–127°C.

EXAMPLE 10

This example illustrates the preparation of bis (3,5-dichloro2,6-difluoro-4-pyridyl) amine, having the formula:-

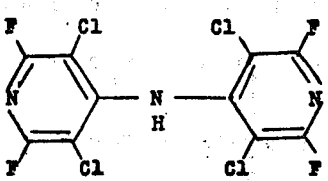

Under an atmosphere of dry nitrogen, a suspension of 50% sodium hydride dispersion in mineral oil (4.6 g. 0.1M) (washed with dry petroleum ether) in dry dimethyl formamide (25 ml.) was treated dropwise with a solution of 4-amino-3,5-dichloro-2,6-difluoro pyridine (10.0 g.; 0.05M) in dry dimethyl formamide (50 ml.) the temperature being kept below 30°. After 10 minutes stirring effervescence had ceased; a solution of 3,5-dichloro-2,4,6-trifluoropyridine (10.0 g.); in dry dimethyl formamide (25 ml.) was then added dropwise over a period of 40 minutes, keeping the temperature below 30°. After a further 10 minutes, effervescence ceased and a clear solution was obtained. This was treated dropwise with water (100 ml.) the temperature being kept below 30°; and the reaction mixture was poured into water (200 ml.).

The solution was then acidified to pH 2 with concentrated hydrochloric acid and the resulting oil extracted with chloroform. After drying, removal of solvent, and recrystallising the solid residue from cyclohexane, recrystallisation from 50% aqueous ethanol gave the product as white crystals of m.p. 123°–124.3°.

EXAMPLE 11

By a procedure similar to those given in Examples 9 and 10 but using the appropriate reactants the compounds numbered 2 to 49, 51, 52, 54, 57 to 61 in Table 1 were prepared.

EXAMPLE 12

This example illustrates the preparation of 2-carbamoyl-3,3',5,5,'6-pentachloro-2',6'-difluoro-4,4'-dipyridylamine (compound No. 53, Table 1), having the formula:-

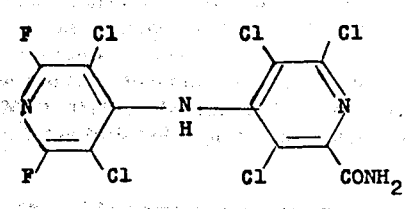

concentrated aqueous ammonia solution (S.G. 0.880; 40 cc.) was added to a solution of 2-methoxy carbonyl-3,3',5,5',6-pentachloro-2',6'-difluoro-4,4'-dipyridylamine (compound No. 48, Table I; 3.0 g.) in acetone (20 cc.) and the resulting mixture stirred at 60°–70°C for 30 minutes. A further portion of ammonia solution (10 cc) was added and the solution kept at room temperature for 16 hours and then evaporated under reduced pressure. The residual solid obtained was recrystallised from ethanol to yield 2-carbamoyl-3,3',5,5',6-pentachloro2',6'-difluoro-4,4'-dipyridylamine, m.p. 204°–205°C.

EXAMPLE 13

This example illustrates the preparation of 2-carboxy-3,3',5,5',6-pentachloro-2',6'-difluoro-4,4'-diphenylamine (Compound No. 50 of Table I) having the formula:

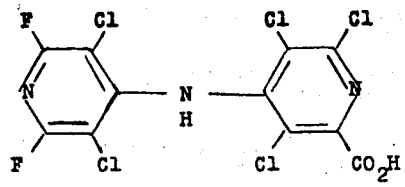

2-Methoxycarbonyl-3,3',5,5',6-pentachloro-2',6'-difluoro-4,4'-di-pyridylamine (Compound No. 48, Table I, 1.0 g.) was refluxed with 10% (w/v) sodium hydroxide solution (25 cc.) for 30 minutes after which the mixture was acidified with hydrochloric acid. The oil which precipitated was collected by extraction with ethylacetate and the extracts, after drying over anhydrous sulphate, were evaporated under reduced pressure. The residual solid was recrystallised from aqueous methanol to yield 2-carboxy-3,3',5,5',6-pentachloro-2',6'-difluoro-4,4'-dipyridylamine, melting with decomposition at 210°–211°C.

EXAMPLE 14

3,3′,5,5′-tetrachloro-2,2,′,6,6′-tetrafluoro-4,4′-dipyridylamine was converted to its potassium salt (Compound No. 55, Table I) by adding the stoicheometric amount of a 10% (w/v) aqueous solution of potassium hydroxide to a methanolic solution of the dipyridylamine, and evaporating the mixture to dryness. The resulting solid residue was recrystallised from a mixture of ethanol and petroleum ether to give the pure potassium salt. Compounds 56, 62 and 63 were also prepared and purified by a similar process.

EXAMPLE 15

The activity of a number of the compounds was tested against a variety of insect and other invertibrate pests. The compound were used in the form of a liquid preparation containing 0.1% by weight of the compound escept in the tests with *Aedes aegypti* and *Meloidogyne incognita* where the preparations contained 0.01% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name LISSAPOL NX until the liquid preparations contained the required concentration of the compound. LISSAPOL is a registered Trade Mark.

The test procedure adopted with regard to each pest was basically the same and comprised supporting a number of the pests on a medium which was usually a host plant or a foodstuff on which the pests feed, and treating either or both the pests and the medium with the preparations.

The mortality of the pests was then assessed at periods usually varying from 1 to 3 days after the treatment.

The results of the tests are given below in Table 2. In this table the first column indicates the name of the pest species. Each of the subsequent columns indicates the host plant or medium on which it was supported, the number of days which were allowed to elapse after the treatment before assessing the mortality of the pests, and the results obtained for each of the compounds, numbered as in Table I above. The assessment is expressed in integers which range from 0–3.
0 represents less than 30% kill
1 represents 30–49% kill
2 represents 50–90% kill
3 represents over 90% kill. A dash (-) in Table 2 indicates that no test was carried out.

TABLE 2

| Pest Species | Support Medium | No. of days | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|---|
| *Tetranychus telarius* (red spider mites, adults) | French bean | 3 | 3 | 3 | 3 | 3 | 3 | 3 | 3 | 2 | 3 | 3 | 0 | 3 | 1 | 3 | 3 | 3 | 2 | 0 | 3 | 3 | 3 | 3 |
| *Tetranychus telarius* (red spider mites, eggs) | French bean | 3 | 0 | 3 | 3 | 3 | 0 | 0 | 0 | 3 | 0 | 0 | 0 | 3 | 0 | 0 | 3 | 1 | 0 | 0 | 0 | 3 | 3 | 0 |
| *Aphis fabae* (green aphids) | Broad bean | 2 | 2 | 3 | 1 | 3 | 2 | 0 | 0 | 0 | 0 | 0 | 0 | 2 | 0 | 2 | 0 | 2 | 0 | 0 | 0 | 0 | 3 | 2 |
| *Megoura viceae* (black aphids) | Broad bean | 2 | 0 | 3 | 0 | 3 | 3 | 0 | 0 | 0 | 0 | 0 | 0 | 0 | 0 | 1 | 0 | 0 | 0 | 0 | 0 | 0 | 3 | 0 |
| *Aedes aegypti* (mosquito larvae) | Water | 1 | 3 | 1 | 0 | 3 | 3 | 0 | 3 | 3 | 3 | 0 | 0 | 0 | 0 | 3 | 3 | 3 | 0 | 0 | 0 | 2 | 0 | — |
| *Aedes aegypti* (mosquito adults) | Plywood | 1 | 3 | 3 | 2 | 3 | 2 | 3 | 3 | 0 | 0 | 0 | 0 | 0 | 0 | 3 | 0 | 2 | 0 | 0 | 0 | 0 | 0 | 2 |
| *Musca domestica* (houseflies - contact test*) | Milk/sugar | 2 | 0 | 3 | 3 | 3 | 3 | 3 | 3 | 0 | 3 | 2 | 2 | 3 | 0 | 3 | 0 | 0 | 1 | 1 | 0 | 0 | 1 | 3 |
| *Musca domestica* (houseflies - residual test*) | Plywood | 2 | 0 | 1 | 0 | 2 | 0 | 1 | 3 | 0 | 0 | 0 | 0 | 0 | 0 | 0 | 0 | 0 | 0 | 0 | 0 | 0 | 0 | 0 |
| *Pieris brassicae* (cabbage white caterpillars) | Cabbage | 2 | 2 | 3 | 0 | 0 | 3 | 3 | 3 | 0 | 0 | 0 | 0 | 0 | 0 | 3 | 3 | 3 | 0 | 0 | 0 | 0 | 0 | 3 |
| *Plutella Maculipennis* (diamond back moth, larvae) | Mustard/paper | 2 | 0 | 2 | 2 | 2 | 0 | 2 | 3 | 2 | 3 | 2 | 2 | 0 | 0 | 3 | 0 | 2 | 0 | 0 | 0 | 0 | 0 | 3 |
| *Phaedon Cochleariae* (mustard beetles) | Mustard/paper | 2 | 0 | 0 | 2 | 0 | 1 | 1 | 1 | 0 | 2 | 0 | 0 | 0 | 0 | 2 | 2 | 2 | 0 | 0 | 0 | 0 | 1 | 1 |
| *Meloidogne incognita* (nematodes) | Water | 1 | — | 3 | 0 | 3 | — | — | — | 0 | 0 | 0 | 0 | 3 | 0 | — | 0 | — | — | 0 | 0 | 3 | — | — |

| Pest Species | Support Medium | No. of days | 24 | 25 | 26 | 27 | 28 | 29 | 33 | 34 | 35 | 36 | 37 | 38 | 39 | 40 | 41 |
|---|---|---|---|---|---|---|---|---|---|---|---|---|---|---|---|---|---|
| *Tetranychus telarius* (red spider mites, adults) | French Bean | 3 | 3 | 3 | 3 | 3 | 3 | 3 | 1 | 3 | 3 | 2 | 0 | 3 | 3 | 3 | 3 |
| *Tetranychus telarious* (red spider mites, eggs) | French Bean | 3 | 3 | 3 | 3 | 3 | 0 | 0 | 0 | 3 | 3 | 3 | 3 | 3 | 3 | 3 | — |
| *Aphis fabae* (green aphids) | Broad Bean | 2 | 0 | 1 | 0 | 0 | 3 | 0 | 0 | 3 | 3 | 2 | 3 | 3 | 3 | 3 | 3 |
| *Megoura viceae* (black aphids) | Broad Bean | 2 | 0 | 2 | 0 | 0 | 3 | 0 | 0 | 3 | 3 | 3 | 3 | 3 | 3 | 3 | 3 |
| *Aedes aegypti* (mosquito larvae) | Water | 1 | 3 | 3 | 3 | 0 | 3 | 3 | 0 | 3 | 3 | 3 | 3 | 3 | 3 | 3 | 3 |
| *Aedes aegypti* (mosquito adults) | Plywood | 1 | 0 | 0 | 0 | 0 | 0 | 0 | 0 | 3 | 3 | 0 | 3 | 3 | 2 | 3 | 0 |

TABLE 2-continued

| Pest Species | Support Medium | No. of days | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|---|
| *Musca domestica* (houseflies - contact test*) | Milk/sugar | 2 | 0 | 1 | 0 | 0 | 0 | 0 | 0 | 0 | 0 | 0 | 3 | 3 | 3 | 3 | 2 | 3 | 1 | | | | | |
| *Musca domestica* (houseflies - residual test*) | Plywood | 2 | 0 | 0 | 0 | 0 | 0 | 0 | 0 | 0 | 0 | 3 | 3 | 2 | 2 | 0 | 2 | 0 | | | | | | |
| *Pieris brassicae* (cabbage white caterpillars) | Cabbage | 2 | 0 | 0 | 0 | 0 | 0 | 0 | 0 | 0 | 3 | 3 | 2 | — | 3 | 0 | 3 | 2 | | | | | | |
| *Plutella maculipennis* (diamond back moth, larvae) | Mustard/paper | 2 | 1 | 0 | 0 | 0 | 0 | 0 | 0 | 0 | 0 | 3 | 3 | 2 | 0 | 3 | 3 | 0 | | | | | | |
| *Phaedon cochleariae* (mustard beetles) | Mustard/paper | 2 | 0 | 0 | 0 | 0 | 0 | 0 | 0 | 0 | 0 | 3 | 1 | 3 | 3 | 3 | 3 | 0 | | | | | | |
| *Meloidogyne incognita* nematodes | Water | 1 | 0 | 0 | 0 | 0 | 0 | 0 | 0 | 3 | 3 | 3 | — | 0 | — | — | 0 | | | | | | | | |

| Pest Species | Support medium | No. of days | 42 | 43 | 44 | 45 | 47 | 48 | 49 | 51 | 52 | 54 | 55 | 57 | 58 | 59 | 61 |
|---|---|---|---|---|---|---|---|---|---|---|---|---|---|---|---|---|---|
| *Tetranychus telarius* (red spider mites, adults) | French Bean | 3 | 3 | 0 | 3 | 0 | 3 | 0 | 3 | 1 | 3 | 0 | 3 | 3 | 3 | 3 | 3 |
| *Tetranychus telarius* (red spider mites, eggs) | French Bean | 3 | 3 | 0 | 3 | 0 | 3 | 0 | 3 | 0 | 3 | 0 | 3 | 0 | 3 | 0 | 3 |
| *Aphis fabae* (green aphids) | Broad Bean | 2 | 3 | 0 | 0 | 0 | 3 | 0 | 3 | 3 | 3 | 0 | 3 | 3 | 3 | 3 | 3 |
| *Megoura viceae* (black aphids) | Broad Bean | 2 | 3 | 0 | 0 | 0 | 3 | 0 | 3 | 3 | 0 | 0 | 3 | 3 | 3 | 2 | 0 |
| *Aedes aegypti* (mosquito larvae) | Water | 1 | — | 0 | 3 | 2 | 0 | 3 | 3 | 0 | 3 | 0 | 3 | 0 | 3 | 0 | 3 |
| *Aedes aegypti* (mosquito adults) | Plywood | 1 | 0 | 0 | 0 | 0 | 3 | 0 | 3 | 0 | 0 | 0 | 3 | 0 | 0 | .2 | 0 |
| *Musca domestica* (houseflies - contact test*) | Milk/Sugar | 2 | 0 | 1 | 3 | 0 | 0 | 0 | 3 | 0 | 3 | 0 | 3 | 0 | 3 | 0 | 3 |
| *Musca domestica* (houseflies - residual test*) | Plywood | 2 | 0 | 0 | 0 | — | 0 | 0 | 2 | 0 | 0 | 0 | 3 | 0 | 0 | 0 | 0 |
| *Pieris brassicae* (cabbage white caterpillars) | Cabbage | 2 | 0 | 0 | 0 | 0 | 0 | 3 | 3 | 0 | 0 | 0 | 3 | 0 | 2 | 0 | 3 |
| *Plutella maculipennis* (diamond back moth, larvae) | Mustard/paper | 2 | 0 | 0 | 0 | 0 | 0 | 1 | 3 | 0 | — | 0 | 0 | 0 | 0 | 0 | 0 |
| *Phaedon cochleariae* (mustard beetles) | Mustard/paper | 2 | 0 | 0 | 0 | 0 | 0 | 0 | 0 | 0 | 0 | 0 | 0 | 0 | 0 | 0 | 0 |
| *Meloidogyne incognita* (nematodes) | Water | 1 | — | — | — | 0 | — | — | 3 | 0 | — | 3 | — | — | — | — | — |

*In the contact test the flies are sprayed directly; in the residual test the flies are placed on a medium that had previously been treated. Compound No. 16 (Table I) also killed *Calandra granaria* (grain weevils) in a similar test. Compound No. 60 demonstrated an antifeeding effect on *Pieris brassicae* larvae. Compound No. 50 showed herbicidal properties in this test.

Compounds Nos. 34 and 35 were also tested at lower concentrations and at 5 and 250 ppm. respectively gave a complete kill of both organophosphorus compound susceptible and resistant red spiders (*Tetranychus telarius*).

EXAMPLE 16

Compounds of the invention were tested for molluscicidal activity and details of the tests conducted are as follows.

A weighed sample of the compound under test was dissolved in 0.5 cc. of an ethanol and acetone mixture (50:50 v/v). The solution was diluted with 0.5 cc. water and poured onto a calf feeding pellet in a glass petri dish and the pellet was air dried for 24 hours. The weight of compound used was chosen so that the dried pellet contained 4% by weight of the active ingredient. Two replicates each consisting of a plastic petri dish containing a pellet, 2 slugs, and a moistened filter paper to maintain a high relative humidity were used in each test. The dishes were left in the cold room (10°C). After 6 days the kill was assessed.

The slugs used were *Agriolimax reticulatus* (Mull), and they had been starved for 24 hours before the commencement of the tests. The results of the test are set out in Table 3 below.

TABLE 3

| Compound No. | % kill of slugs | Compound No. | % kill of slugs |
|---|---|---|---|
| 3 | 50 | 25 | 100 |
| 5 | 50 | 27 | 50 |
| 8 | 50 | 37 | 100 |
| 9 | 50 | 49 | 100 |
| 14 | 50 | 61 | 50 |
| 16 | 100 | | |

EXAMPLE 17

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying and drenching contained 0.01% of the test compound. The plants were then infected with the disease it was desired to control and after a period of days, depending upon the particular disease, the extent of the disease was visually assessed. The results are given in Table 4.a below, wherein the extent of the disease is given in the form of a grading as follows:-

| Grading | Percentage Amount of Disease |
|---|---|
| 0 | 61 to 100 |
| 1 | 26 to 60 |
| 2 | 6 to 25 |
| 3 | 0 to 5 |

In Table 4 the disease is given in the first column, and in the second column is given the time which elapsed between infecting the plants and assessing the amount of disease.

TABLE 4

| Disease and Plant | Time interval (days) | Disease code letter (Table 4a) |
|---|---|---|
| Puccinia recondita (wheat) | 10 | A |
| Phytophthora infestans (tomato) | 3 | B |
| Podosphaera leucotricha (apple) | 10 | C |
| Uncinula necator (vine) | 10 | D |
| Plasmopara viticola (vine) | 7 | E |
| Piricularia oryzae (rice) | 7 | F |

TABLE 4a

| No. of Compound (Table 1) | A | B | C | D | E | F |
|---|---|---|---|---|---|---|
| 1 | 2 | — | 3 | 3 | 3 | 3 |
| 2 | 2 | — | 3 | 3 | 3 | 0 |
| 3 | 2 | 2 | 3 | 3 | 3 | 3 |
| 4 | 2 | — | 3 | 3 | 3 | 3 |
| 5 | 3 | 3 | 3 | 3 | 3 | 3 |
| 6 | 0 | — | 3 | — | 3 | — |
| 7 | 0 | — | 3 | 2 | 2 | 0 |
| 8 | 2 | — | 0 | 2 | 0 | 0 |
| 9 | 2 | — | 0 | 0 | 0 | 0 |
| 11 | 0 | 2 | 0 | 0 | 0 | 0 |
| 12 | 2 | — | 2 | 3 | 2 | 0 |
| 13 | 2 | — | 0 | 2 | 0 | 0 |
| 14 | 1 | — | 3 | 3 | 3 | 3 |
| 16 | 3 | — | 3 | 2 | 3 | 3 |
| 17 | 2 | — | 3 | 0 | 0 | 0 |
| 19 | — | 0 | 0 | — | 0 | 0 |
| 20 | — | 3 | 0 | — | 3 | 0 |
| 21 | — | 3 | 2 | — | 3 | 3 |
| 22 | — | 3 | 0 | — | 3 | 0 |
| 23 | 0 | 1 | 0 | 0 | 0 | 0 |
| 24 | 2 | 2 | 3 | 3 | 3 | 2 |
| 25 | 3 | —3 | 3 | 3 | 0 | |
| 26 | 2 | 0 | 3 | 3 | 3 | 0 |
| 27 | 2 | 1 | 2 | 0 | 2 | 3 |
| 28 | 3 | — | 3 | 3 | 3 | 0 |
| 29 | 0 | — | 2 | 3 | 3 | 3 |
| 31 | 0 | 0 | 0 | 3 | 0 | 1 |
| 35 | — | — | 2 | — | — | — |
| 41 | 2 | — | 3 | 3 | 3 | 0 |
| 42 | 0 | — | 3 | — | 3 | 0 |
| 43 | 0 | 3 | 0 | 2 | 3 | 0 |
| 44 | 0 | — | — | 2 | 3 | 0 |
| 51 | 1 | — | 3 | 3 | 3 | — |
| 52 | 2 | — | — | — | — | — |
| 57 | 0 | — | — | — | 3 | 3 |
| 58 | 0 | — | 3 | 3 | 3 | — |
| 59 | 2 | 3 | 0 | 1 | 3 | 0 |
| 61 | — | — | — | 3 | 3 | — |

EXAMPLE 18

The culture *Fusarium culmorum* was maintained on 2% malt agar test tube slopes at 20°C. Thirteen to seventeen days prior to testing the chemical, the culture was transferred to soil cornmeals, which consisted of 400 grams of 5% maize meal in John Innes seed compost contained in a ½ pint bottle. The cornmeals were plugged with cotton wool and sterilized in an autoclave for 2 hours, before inoculation. Two days prior to testing the chemical, the seeds and the soil were prepared. The soil was prepared by mixing the cornmeals with John Innes seed compost at the rate of 2 cornmeals to 3 buckets of compost (2 gallon capacity buckets). The seeds were prepared by rolling 10 grams of wheat seeds in a 25% china clay formulation of the chemical (where the chemical was a powder) or a 12.5% china clay formulation (where the chemical was a liquid) at the rate of 1000 ppm weight/weight, eg. 40 milligrams of 25% formulation on 10 grams of seeds. To test the chemical approximately 100 grams of the mixed soil was placed in a fibre pot, twenty seeds were placed on the surface and a further approximate 100 grams were placed on top of the seeds. This was repeated 3 times making four replicates in all. The pots were maintained in the greenhouse between 16°C and 20°C. After 10 days the number of germinated seeds was recorded and after 17 days the roots were uncovered and the number healthy recorded. These recordings were compared with untreated seeds and seeds treated with mercury (Agrosan) and calculations were made to obtain a grading for disease control. The gradings used were the same as those of the previous Example, and the results are given in Table 5 below.

TABLE 5

| No. of Compound (Table 1) | Grading |
|---|---|
| 4 | 2 |
| 7 | 3 |
| 8 | 2 |
| 12 | 1 |
| 14 | 2 |
| 54 | 3 |

EXAMPLE 19

The culture *Rhizoctonia solani* was maintained on soil cornmeals, which consisted of 400 grams of 5% maize meal in John Innes seed compost contained in a ½ pint bottle. The cornmeals were plugged with cottonwool and sterilized in an autoclave for 2 hours before inoculation. Nine days prior to testing the chemical, the soil was prepared by mixing the cornmeals with John Innes seed compost at the rate of 1 cornmeal to 1½ buckets of compost (2 gallon capacity buckets). Four days before testing the chemical, it was mixed with 400 grams of soil in a quart bottle at the rate of 100 ppm. weight/weight. Approximately 100 grams of John Innes seed compost was placed in a fibre pot, eight cotton seeds were placed on the surface, and 100 grams of the mixed soil was placed on top of the seeds. This was repeated three times, making four replicates in all. After 13 days the seedlings were assessed for disease. These assessments were compared with untreated seeds and calculations were made to obtain a grading for disease control. The gradings used were the same as those of the previous two examples. Compound No. 7 of Table I gave a grading of 3 and Compound No. 29 a grading of 2.

EXAMPLE 20

The activity of the compound of the invention against a wide variety of plant bacterial diseases and fungal post-harvest saprophytic diseases was investigated by in vitro tests as follows. 5 mg. of the compound under test was dissolved or suspended in 10 cc. of acetone and 2 cc. of this solution or suspension was added to 18 cc. of nutrient agar (for the bacterial diseases) or 16 cc. of 2% malt agar (for the fungal diseases) to give a final concentration of 50 parts per million of the compound under test. 2 cc. of a streptomycin preparation containing 100 units/cc. was added to the malt agar to prevent bacterial contamination of the fungal tests.

The agar preparations were dried overnight in petri dishes and inoculated the following morning with the bacterial or fungal diseases using a multipoint inoculator. The antibacterial activity was assessed after 5 days and the antifungal activity after 6 days.

The results of the tests are set out below in Table 7 (antibacterial activity) and Table 8 (antifungal activity). The results are graded as in Example 16 above. The names of the disease organisms are indicated in Table 6.

TABLE 6

| Bacterial Disease Organism | Code Table 7 | Fungal disease Organism | Code Table 8 |
|---|---|---|---|
| Agrobacterium tumifaciens | B1 | Nigrospora sphaerica | F1 |
| Corynebacterium michiganense | B2 | Phytophthora citrophthora | F2 |
| Erwinia sarotovora | B4 | Alternaria citri | F3 |
| Xanthomonas oryzae | B5 | Diplodia natalensis | F4 |
| Psendomonas syringae | B6 | Phomopsis citri | F5 |
| Streptomyces scabies | B7 | Ceratocystis paradoxa | F6 |
| Pseudomonas mors-prunorum | B8 | Gloeosporium musarum | F7 |
| Pseudomonas phaseolicola | B9 | Penicillium digitatum | F8 |
| Erwinia amylovora | B10 | Phoma exigua | F9 |
| | | Botrytis tulipae | F10 |
| | | Botrodiplodia theobromae | F11 |
| | | Fusarium caeruleum | F12 |

TABLE 7

| Compound No. Table I | Disease Code (Table 6) | | | | | | | | | |
|---|---|---|---|---|---|---|---|---|---|---|
| | B1 | B2 | B3 | B4 | B5 | B6 | B7 | B8 | B9 | B10 |
| 2 | 0 | 2 | 0 | 0 | 0 | 0 | 0 | 0 | 0 | 0 |
| 41 | 3 | 3 | 3 | 3 | 3 | 3 | 3 | 3 | 3 | 3 |
| 61 | 3 | 3 | 3 | 3 | 3 | 3 | 3 | 3 | 3 | 3 |

TABLE 8

| Compound No. Table I | Disease Code (Table 6) | | | | | | | | | | | |
|---|---|---|---|---|---|---|---|---|---|---|---|---|
| | F1 | F2 | F3 | F4 | F5 | F6 | F7 | F8 | F9 | F10 | F11 | F12 |
| 2 | 3 | 0 | 0 | 2 | 0 | 0 | 0 | 0 | 0 | 0 | 0 | 0 |
| 41 | 3 | 3 | 3 | 3 | 3 | 3 | 3 | 3 | 3 | — | — | 3 |
| 61 | 3 | 3 | 3 | 3 | 3 | 3 | 3 | 3 | 3 | 3 | 3 | 3 |

EXAMPLE 21

Compounds of the invention were tested as potential algicides. A mixed algal culture was treated with a quantity of an aqueous suspension of the compound under test so that the culture contained 20 parts per million of the compound. The following compounds were found to completely control the algal growth at this concentration. Compound Nos. 24, 25, 28, 41, 42, 43, 44, 52, 54, 58 and 61.

EXAMPLE 22

This Example illustrates the herbicidal properties of the compounds of the present invention. The compounds were ball-milled in water containing a surface-active agent sold under the name of Lissapol and comprising a condensate of p-nonylphenol with seven to eight molar proportions of ethylene oxide. The ball-milled material was diluted with water to give a spray composition containing 0.1% of the surface-active agent, and sprayed on to young pot plants of the species listed in Table 9 below (Post-emergence test). The rate of application of the active ingredient was equivalent to 10 pounds per acre and the spray volume 100 gallons per acre. Damage to the plants was assessed on a scale of 0 to 3 where 0 represents no effect and 3 represents complete kill. In the same experiment pots of soil were sown with seeds of the same plant species and then sprayed with the above spray composition at the rate of 10 pounds per acre of active ingredient (Pre-emergence test). The results are given in Table 9 below.

TABLE 9

| No. of Compound (Table 1) | Pre-emergence | | | | Post-emergence | | | |
|---|---|---|---|---|---|---|---|---|
| | Lettuce | Tomato | Wheat | Maize | Lettuce | Tomato | Wheat | Maize |
| 2 | 0 | 0 | 0 | 0 | 2 | 2 | 0 | 0 |
| 3 | 0 | 0 | 0 | 0 | 0 | 1 | 0 | 0 |
| 4 | 0 | 0 | 0 | 0 | 1 | 3 | 0 | 0 |
| 5 | 3 | 0 | 0 | 0 | 3 | 3 | 0 | 0 |
| 6 | 3 | 0 | 0 | 0 | 3 | 3 | 0 | 0 |
| 7 | 0 | 0 | 0 | 0 | 3 | 3 | 0 | 0 |
| 9 | 0 | 0 | 0 | 0 | 3 | 3 | 0 | 0 |
| 14 | 3 | 3 | 0 | 0 | 3 | 3 | 0 | 0 |
| 19 | 0 | 0 | 0 | 0 | 2 | 2 | 0 | 0 |
| 20 | 2 | 0 | 3 | 0 | 3 | 1 | 2 | 0 |
| 21 | 2 | 0 | 3 | 1 | 2 | 0 | 0 | 0 |
| 22 | 1 | 0 | 0 | 0 | 2 | 0 | 0 | 0 |

These results demonstrate that the compounds of this invention have herbicidal properties, and also that some compounds have particularly useful selective herbicidal activity against broad-leaved plants.

The following test illustrates the herbicidal properties of other compounds according to the invention. The compounds were formulated for the test described below by ball milling them in water containing 2% of DISPERSOL T, ("Dispersol T" is a registered Trade Mark for a surface active agent comprising methylene dinaphthalene sulphonate).

The suspensions so obtained were diluted with water and sprayed at a rate corresponding to 100 gallons per acre on to (a) pots of compost which had previously been sown with seeds of lettuce, tomato, wheat and maize (pre-emergence test) and (b) young plants of lettuce, tomato, wheat and maize growing in pots (post-emergence test). The rates of application of the compounds are given in Table 10 below. After 14 days the damage to the plants was assessed on a scale of 0 to 3 where 0 represents less than 25% damage and 3 represent 75 to 100% damage, the latter figure representing complete kill.

Compounds Nos. 35 to 40 in Table 10 were so active that it was necessary to apply them at the reduced rate of 1 lb per acre. All the other compounds were applied at the rate of 10 lb per acre.

TABLE 10

| No. of Compound | Pre-emergence | | | | Post-emergence | | | |
|---|---|---|---|---|---|---|---|---|
| | Lettuce | Tomato | Wheat | Maize | Lettuce | Tomato | Wheat | Maize |
| 24 | 0 | 0 | 0 | 0 | 1 | 1 | 0 | 0 |
| 25 | 3 | 3 | 3 | 0 | 3 | 3 | 0 | 3 |
| 26 | 0 | 1 | 0 | 0 | 0 | 0 | 0 | 0 |
| 27 | 0 | 0 | 0 | 0 | 0 | 1 | 0 | 0 |
| 28 | 2 | 3 | 2 | 1 | 3 | 2 | 0 | 0 |
| 29 | 3 | 3 | 2 | 1 | 3 | 3 | 0 | 0 |
| 33 | 0 | 3 | 0 | 0 | 2 | 3 | 0 | 0 |
| 34 | 3 | 3 | 3 | 3 | 3 | 3 | 3 | 3 |
| 35 | 3 | 3 | 3 | 3 | 3 | 3 | 0 | 0 |
| 36 | 3 | 0 | 1 | 0 | 0 | 2 | 0 | 0 |
| 37 | 3 | 3 | 3 | 3 | 3 | 3 | 3 | 3 |
| 38 | 3 | 3 | 3 | 3 | 3 | 3 | 0 | 1 |
| 39 | 3 | 3 | 3 | 2 | 3 | 3 | 2 | 2 |
| 40 | 3 | 3 | 3 | 3 | 3 | 3 | 1 | 1 |
| 41 | 3 | 3 | 0 | 0 | 3 | 3 | 0 | 0 |
| 42 | 3 | 2 | 0 | 0 | 3 | 1 | 0 | 0 |
| 43 | 3 | 1 | 3 | 0 | 0 | 2 | 0 | 0 |
| 44 | 0 | 0 | 0 | 1 | 1 | 1 | 0 | 0 |
| 45 | 0 | 0 | 0 | 0 | 1 | 0 | 0 | 0 |
| 46 | 3 | 3 | 3 | 2 | 3 | 3 | 1 | 3 |
| 48 | 3 | 0 | 3 | 3 | 0 | 1 | 0 | 0 |
| 49 | 3 | 3 | 3 | 1 | 3 | 3 | 0 | 0 |
| 50 | 2 | 2 | 0 | 0 | 3 | 3 | 0 | 0 |
| 51 | 3 | 3 | 2 | 3 | 0 | 0 | 0 | 0 |
| 52 | 3 | 3 | 3 | 3 | 3 | 1 | 0 | 0 |
| 55 | 3 | 3 | 3 | 3 | 3 | 3 | 3 | 3 |
| 56 | 0 | 0 | 0 | 0 | 0 | 1 | 0 | 0 |
| 57 | 3 | 3 | 0 | 0 | 3 | 3 | 0 | 0 |
| 58 | 3 | 3 | 3 | 2 | 3 | 3 | 2 | 1 |
| 59 | 1 | 0 | 0 | 0 | 3 | 3 | 0 | 0 |

Compound No. 34 was sprayed onto a further group of plant species in a test conducted in the same way as the preceding test; the results are given in Table 11 below:

TABLE 11

| Application rate pounds/acre | Pre-Emergence | | | | | | | |
|---|---|---|---|---|---|---|---|---|
| | Sb | Ka | Ca | Pea | On | Bar | Ri | Oat |
| 0.2 | 0 | 0 | 0 | 0 | 0 | 4 | 0 | 2 |
| 1.0 | 5 | 5 | 2 | 4 | 0 | 4 | 4 | 4 |
| 5.0 | 5 | 5 | 5 | 5 | 5 | 5 | 5 | 5 |
| | Post-Emergence | | | | | | | |
| 0.2 | 5 | 5 | 5 | 1 | 0 | 3 | 0 | 1 |
| 1.0 | 5 | 5 | 5 | 5 | 3 | 5 | 0 | 5 |
| 5.0 | 5 | 5 | 5 | 5 | 5 | 5 | 1 | 5 |

The abbreviations used in Table 11 have the following meanings.

| Abbreviation | Plant |
|---|---|
| Sb | Sugar Beet |
| Ka | Kale |
| Ca | Cabbage |
| On | Onion |
| Bar | Barley |
| Ri | Rice |

The results in the foregoing Table 11 show that in the post-emergence test, rice was resistant to Compound No. 34 applied in amounts which were highly injurious to all of the other plant species in the test.

Further compounds were tested in a similar test at a rate of 5 lb. per acre, and the results obtained are given in Table 12.

TABLE 12

| No. of Compound | Sb | Ka | Ca | Pre-emergence Pea | On | Bar | Ri | Oat |
|---|---|---|---|---|---|---|---|---|
| 25 | 0 | 1 | 0 | 1 | 0 | 0 | 0 | 0 |
| 29 | 0 | 0 | 0 | 0 | 0 | 0 | 0 | 0 |
| 41 | 0 | 0 | 0 | 0 | 0 | 0 | 0 | 0 |
| 42 | 0 | 0 | 4 | 0 | 0 | 0 | 0 | 0 |
| 43 | 0 | 0 | 0 | 0 | 0 | 1 | 1 | 0 |
| 51 | 4 | 3 | 4 | 1 | — | 2 | 0 | 3 |
| 57 | 0 | 2 | 1 | 0 | 0 | 0 | 0 | 0 |
| 58 | 0 | 0 | 0 | 0 | 5 | 0 | 0 | 4 |
| 59 | 0 | 0 | 0 | 0 | — | 0 | 0 | 0 |
| | Post-emergence | | | | | | | |
| 25 | 5 | 4 | 4 | 2 | 0 | 2 | 0 | 1 |
| 29 | 4 | 2 | 0 | 0 | 0 | 0 | 0 | 0 |
| 41 | 0 | 0 | 4 | 0 | 3 | 0 | 0 | 0 |
| 42 | 3 | 4 | 5 | 2 | 0 | 0 | 0 | 0 |
| 43 | 0 | 0 | 0 | 0 | 0 | 0 | 0 | 0 |
| 51 | 1 | 0 | 0 | 0 | 0 | 0 | 0 | 0 |
| 57 | 0 | 0 | 0 | 0 | 0 | 0 | 0 | 0 |
| 58 | 5 | 3 | 5 | 1 | 0 | 1 | 0 | 0 |
| 59 | 3 | 1 | 0 | 0 | 0 | 0 | 0 | 0 |

EXAMPLE 23

Compounds of the invention were tested against adult and larval cattle ticks (*Boophilus microplus*). The ticks were sprayed with compositions comprising the compound under test and the mortality assessed 24 hours later. The results are given in Table 13 below.

TABLE 13

| Compound No. (Table I) | | % Mortality (adults) | | | | | | % Mortality (Larvae) | | | | | |
|---|---|---|---|---|---|---|---|---|---|---|---|---|---|
| | | 36 | 38 | 39 | 40 | 46 | 47 | 36 | 38 | 39 | 40 | 46 | 47 |
| % Concentration of Compound in spray Composition. | 1.0 | 20 | 90 | 100 | 100 | 100 | 0 | 100 | 100 | 100 | 100 | 100 | 100 |
| | 0.1 | 5 | 5 | 100 | 0 | 85 | 0 | 100 | 100 | 100 | 100 | 100 | 40 |
| | 0.01 | — | — | — | — | — | — | 100 | 100 | 100 | 20 | 100 | 0 |

The following Examples illustrate pesticidal compositions according to the invention.

EXAMPLE 24

This Example illustrates a concentrate comprising a miscible oil which is readily convertible by dilution with water into a liquid preparation suitable for spraying purposes.

The concentrate has the following compositions:

| | % wt. |
|---|---|
| Compound No.1 of Table I | 25.0 |
| 'LUBROL' L (alkylphenol/ethylene oxide condensate; 'Lubrol' is a Trade Mark) | 2.5 |
| Calcium dodecylbenzenesulphonate | 2.5 |
| 'AROMASOL' H (alkylbenzene solvent; 'Armasol' is a Trade Mark) | 70.0 |
| | 100.0 |

EXAMPLE 25

This Example also illustrates a concentrate which is in the form of a miscible oil. The composition of this concentrate is as follows:

| | % wt. |
|---|---|
| Compound no. 2 of Table I | 25.0 |
| 'LUBROL' L ('Lubrol' is a Trade Mark) | 4.0 |
| Calcium dodecylbenzenesulphonate | 6.0 |
| 'AROMASOL' H ('Aromasol' is a Trade Mark) | 65.0 |
| | 100.0 |

EXAMPLE 26

This Example illustrates a wettable powder having the following composition:

| | % wt. |
|---|---|
| Compound no. 3 of Table I | 25.0 |
| Sodium silicate | 5.0 |
| Calcium lignosulphonate | 5.0 |
| China clay | 65.0 |
| | 100.0 |

EXAMPLE 27

This Example illustrates an atomisable fluid comprising a mixture consisting of 25% by weight of the compound no. 4 of Table I and 75% by weight of xylene.

EXAMPLE 28

This Example illustrates a dusting powder which may be applied directly to plants or other surfaces and comprises 1% by weight of compound no. 5 of Table I and 99% by weight of talc.

EXAMPLE 29

25 Parts by weight of compound no. 6 of Table I, 65 parts by weight of xylene, and 10 parts of an alkyl aryl polyether alcohol 'Triton' X-100 ('Triton' is a Trade Mark) were mixed. There was thus obtained an emulsion concentrate which can be mixed with water to produce an emulsion suitable for use in agricultural applications.

EXAMPLE 30

5 Parts by weight of compound no. 7 of Table I were thoroughly mixed in a suitable mixer with 95 parts by weight of talc. There was thus obtained a dusting powder.

EXAMPLE 31

10 Parts by weight of compound no. 1 of Table I, 10 parts of an ethylene oxide-octylphenol condensate ("Lissapol" NX; 'Lissapol' is a Trade Mark) and 80 parts by weight of diacetone alcohol were thoroughly mixed. There was thus obtained a concentrate which, on mixing with water, gave an aqueous dispersion suitable for application as a spray in the control of insect pests.

EXAMPLE 32

This Example illustrates a concentrated liquid formulation in the form of an emulsion. The ingredients listed below were mixed together in the stated proportions and the whole stirred until the constituents were dissolved.

| | % wt. |
|---|---|
| Compound no. 1 of Table I | 20 |
| 'LUBROL' L ('Lubrol' is a Trade Mark) | 17 |
| Calcium dodecylbenzenesulphonate | 3 |
| Ethylene dichloride | 45 |
| 'AROMASOL' H ('Aromasol' is a Trade Mark) | 15 |
| | 100 |

EXAMPLE 33

The ingredients listed below were ground together in the proportions stated to produce a powdered mixture readily dispersible in liquids.

| | % wt. |
|---|---|
| Compound no. 1 of Table I | 50 |
| Dispersol T | 5 |
| China clay | 45 |
| | 100 |

EXAMPLE 34

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | % wt. |
|---|---|
| Compound no. 2 of Table I | 50 |
| Dispersol T | 12.5 |
| Goulac | 5 |
| Calcium dodecylbenzenesulphonate | 12.5 |
| Sodium acetate | 20 |
|  | 100 |

EXAMPLE 35

A composition suitable for use as a seed dressing was prepared by mixing all three of the ingredients set out below in the proportions stated.

|  | % wt. |
|---|---|
| Compound no. 1 of Table I | 80 |
| Mineral Oil | 2 |
| China clay | 18 |
|  | 100 |

EXAMPLE 36

A composition suitable for use as a seed dressing was prepared by mixing all three of the ingredients set out below in the proportions stated.

|  | % wt. |
|---|---|
| Compound no. 4 of Table I | 80 |
| Mineral Oil | 2 |
| China clay | 18 |
|  | 100 |

EXAMPLE 37

A granular composition was prepared by dissolving the active ingredient in a solvent, spraying the solution obtained onto granules of pumice and allowing the solvent to evaporate.

|  | % wt. |
|---|---|
| Compound no. 2 of Table I | 5 |
| Pumice Granules | 95 |
|  | 100 |

EXAMPLE 38

An aqueous dispersion formulation was prepared by mixing and grinding the ingredients recited below in the proportions stated.

|  | % wt. |
|---|---|
| Compound no. 3 of Table I | 40 |
| Calcium lignosulphonate | 10 |
| Water | 50 |
|  | 100 |

The following constitutes an explanation of the compositions or substances represented by the various Trade Marks and Trade Names referred to in the foregoing Examples.

| | |
|---|---|
| 'LUBROL' L | is a condensate of 1 mole of nonyl phenol with 13 molar proportions of ethylene oxide. |
| 'AROMASOL' H | is a solvent mixture of alkylbenzenes. |
| 'DISPERSOL' T | is a mixture of sodium sulphate and a condensate of formaldehyde with the sodium salt of naphthalene sulphonic acid. |
| 'LUBROL' APN 3 | is a condensate of 1 mole of nonyl phenol with 5½ moles of naphthalene oxide. |
| 'CELLOFAS' B 600 | is a sodium carboxymethyl cellulose thickener. |
| 'LISSAPOL' NX | is a condensate of 1 mole of nonyl phenol with 8 moles of ethylene oxide. |

We claim:

1. An insecticidal, miticidal, fungicidal or bacteriacidal composition comprising, as active ingredient, an effective insecticidal, miticidal, fungicidal or bactericidal amount of a compound of the formula:

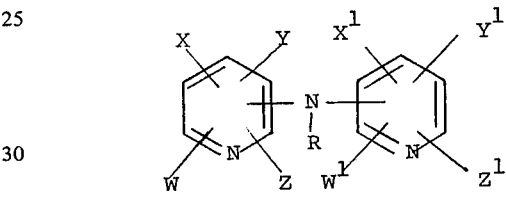

wherein R represents hydrogen or methyl; X, Y, Z and W are halogen and $X^1$, $Y^1$, $Z^1$ and $W^1$ represent hydrogen, fluorine, chlorine, bromine, cyano, nitro, trifluoromethyl, alkoxy containing up to 8 carbon atoms, benzyloxy, phenoxy, ethoxyethoxy, methylthio, phenylthio, methylamino, ethylamino, dimethylamino, methanesulphonyl, carboxyl, carboxylic acid methyl ester or carbamyl provided that all but one of $Y^1$ $X^1$, $Z^1$ and $W^1$ are halogen; potassium or triethyl ammonium salts of such compounds or the N-oxides of such compounds, and a major amount of a carrier therefor.

2. A method of combating pests selected from the group consisting of insects, mites, fungi and bacteria which comprises applying to said pests or the locus thereof, an effective insecticidal, miticidal, fungicidal or bactericidal amount of a compound of the formula:

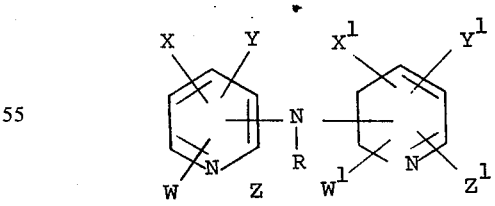

wherein R represents hydrogen or methyl; X, Y, Z and W are halogen and $X^1$, $Y^1$, $Z^1$ and $W^1$ represent hydrogen, fluorine, chlorine, bromine, cyano, nitro, trifluoromethyl, alkoxy containing up to 8 carbon atoms, benzyloxy, phenoxy, ethoxyethoxy, methylthio, phenylthio, methylamino, ethylamino, dimethylamino, methanesulphonyl, carboxyl, carboxylic acid methyl ester or carbamyl, provided that all but one of $Y^1$ $X^1$, $Z^1$ and $W^1$ are halogen; potassium or triethyl ammonium salts of such compounds or the N-oxides of such compounds.

3. A method according to claim 2 wherein said compound has the formula:

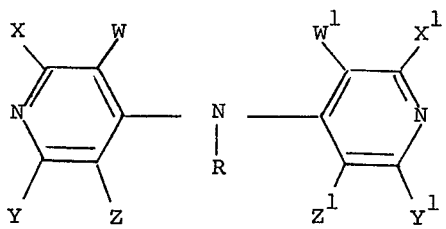

wherein R represents hydrogen or methyl; X, Y, Z and W represent chlorine or fluorine; $X^1$, $Y^1$, $Z^1$ and $W^1$ represent alkoxy of up to 8 carbon atoms, cyano, nitro, trifluoromethyl, hydrogen, chlorine or fluorine, provided that at least three of $X^1$, $Y^1$, $Z^1$ and $W^1$ represent chlorine or fluorine, the potassium or triethyl ammonium salts of such compounds or the N-oxides of such compounds.

4. A method according to claim 2 wherein said compound has the formula:

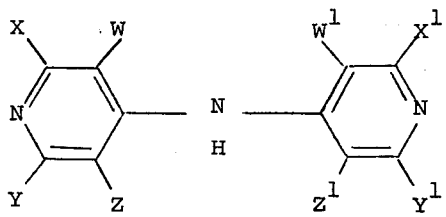

wherein one of W, $W^1$, X, $X^1$, Y, $Y^1$, Z and $Z^1$ represent a methoxy group and the remainder represent atoms of fluorine or chlorine.

5. A method according to claim 2 wherein said compound has the formula:

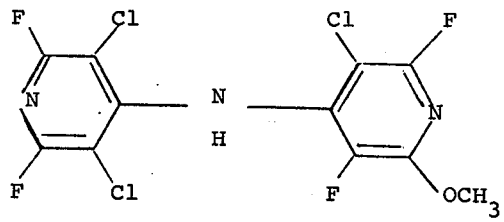

6. A method of treating plants to render them less susceptible to damage by pests selected from the group consisting of insects, mites, fungi and bacteria, which comprises treating the plants or the seeds, corms, bulbs, tubers, rhizomes, or other propagative parts of the plants, with an effective insecticidal, miticidal, fungicidal or bactericidal amount of a compound of the formula:

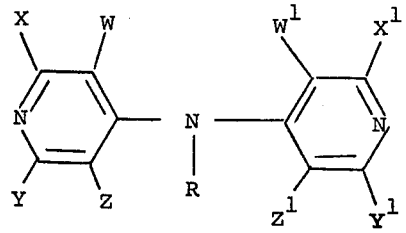

wherein R represents hydrogen or methyl; X, Y, Z and W are halogen and $X^1$, $Y^1$, $Z^1$ and $W^1$ represent hydrogen, fluorine, chlorine, bromine, cyano, nitro, trifluoromethyl, alkoxy containing up to 8 carbon atoms, benzyloxy, phenoxy, ethoxyethoxy, methylthio, phenylthio, methylamino, ethylamino, dimethylamino, methanesulphonyl, carboxyl, carboxylic acid methyl ester or carbamyl provided that all but one of $Y^1$ $X^1$, $Z^1$ and $W^1$ are halogen; potassium or triethyl ammonium salts of such compounds or the N-oxides of such compounds.

7. A method according to claim 6 wherein said compound has the formula:

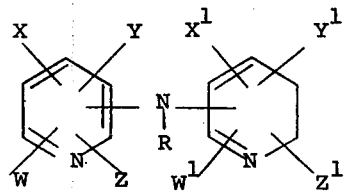

wherein R represents hydrogen or methyl; X, Y, Z and W represent chlorine or fluorine; $X^1$, $Y^1$, $Z^1$ and $W^1$ represent alkoxy of up to 8 carbon atoms, cyano, nitro, trifluoromethyl, hydrogen, chlorine or fluorine, provided that at least three of $X^1$, $Y^1$, $Z^1$ and $W^1$ represent chlorine or fluorine, the potassium or triethyl ammonium salts of such compounds or the N-oxides of such compounds.

8. A method according to claim 6 wherein said compound has the formula:

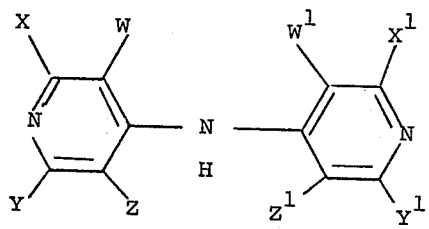

wherein one of W, $W^1$, X, $X^1$, Y, $Y^1$, Z and $Z^1$ represent a methoxy group and the remainder represent atoms of fluorine or chlorine.

9. A method according to claim 6 wherein said compound has the formula:

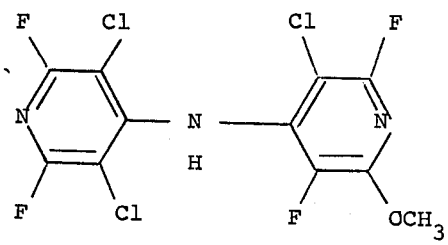

* * * * *